H. P. DOLSON.
Improvement in Spring-Coupling for Vehicles.

No. 126,879. Patented May 21, 1872.

WITNESSES:
Wm. Wagner.
Phil. D. Larner.

INVENTOR.
Hacaliah P. Dolson
By Johnson, Klauerke & Co.
Associate Attorneys 126,879

UNITED STATES PATENT OFFICE.

HACALIAH P. DOLSON, OF HIGHLAND, NEW YORK.

IMPROVEMENT IN SPRING-COUPLINGS FOR VEHICLES.

Specification forming part of Letters Patent No. 126,879, dated May 21, 1872.

*To all whom it may concern:*

Be it known that I, HACALIAH P. DOLSON, of Highland, in the county of Ulster and State of New York, have invented a new and useful Improvement in Spring-Couplings for Vehicles, of which the following is a specification:

The object of my invention is to prevent the main leaf of the end-springs of vehicles from being twisted and broken from their connection with the running-gear, by reason of having unyielding end connections, and, consequently, having no play whatever when the side springs are lengthened by being depressed as they do when carrying heavy loads; and my said invention consists of a peculiar sliding spring-coupling, hereinafter described, whereby a firm connection is made between the end and side springs, while the latter is allowed to have a free lengthwise movement, independent of the end springs, and thus prevent the end springs from being subjected to any strain from sudden twisting or other torsion caused by the descent of the side springs.

Figure 1:
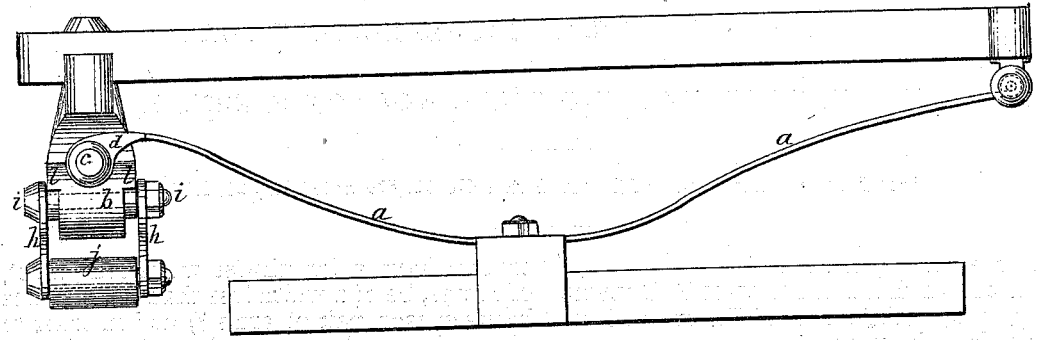
Figure 2:
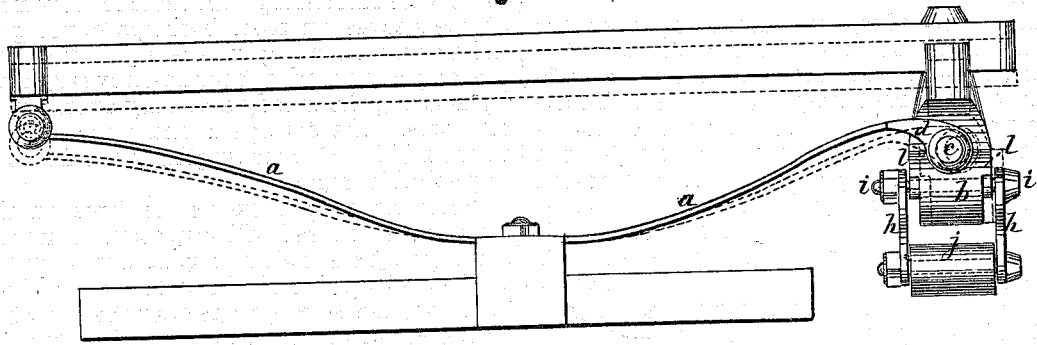
Figure 3:
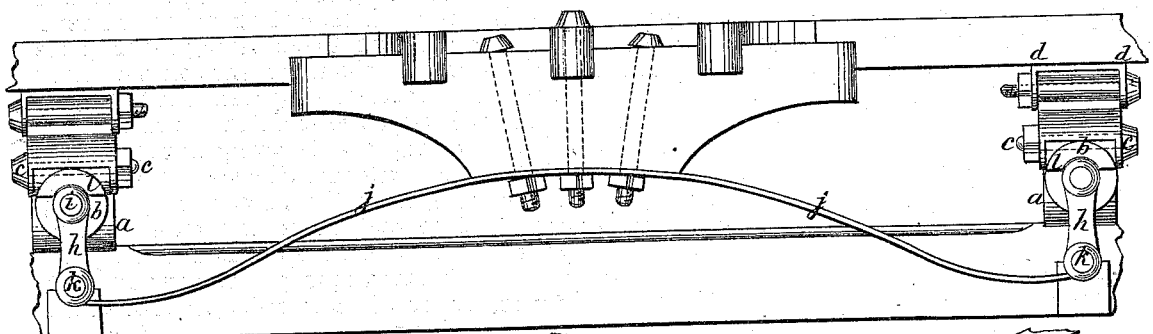
Figure 5:
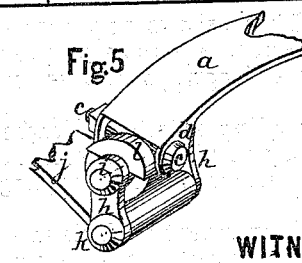
Figure 4:
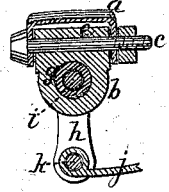
Figure 6:
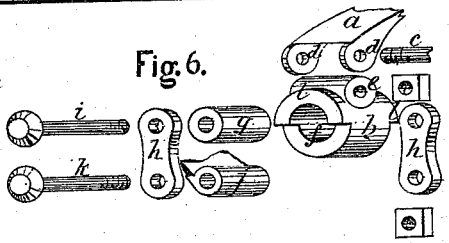

In the accompanying drawing, Figures 1 and 2 represent side elevations of a portion of the running-gear of a vehicle, showing the springs when in their normal position, and when depressed by any weight, to illustrate the advantage of my improvement; Fig. 3 represents an end view of the same, and Fig. 4 a detached sectional view of the parts embracing my invention; Fig. 5 is a view perspective of the spring-coupling, and Fig. 6 a view of the parts thereof separated.

The ends of the side springs $a$ are pivoted to the sleeves $b$ by means of bolts $c$ passing through flanges $d$, on the ends of springs $a$ and sockets $e$, formed at right angles to the central openings $f$ of the sleeves $b$. These sleeves $b$ have an endwise movement upon inner bearing-sleeves $g$, between arms $h$, to which they are secured by bolts $i$, passing through the upper ends of arms $h$ and the inner sleeves $g$, this movement being in the longitudinal line of the side springs $a$, and at right angles to the longitudinal line of end spring $j$. The ends of the end spring $j$ surround bolts $k$, by means of which they are also pivoted between the lower ends of arms $h$. The sleeves $b$, in order to have a lengthwise movement, must, of course, be of a width less than the distance between each pair of arms $h$; and in order to give as large a bearing-surface of the sleeves on their bearing-sleeves $g$, I form caps $l$ on each end of each sleeve $b$, which caps, while in no wise interfering with the free movement of the sleeves on their bearings $g$, yet give the sleeves a bearing-surface equal to almost the length of the inner bearing-sleeves $g$, thereby insuring the steady and easy operation of all parts. The springs $a$ and $j$ are secured in the middle of their lengths to the frame in any suitable manner.

When no weight exerts its force on the springs the sleeves $b$ will be in position on their bearings $g$, as shown in Fig. 1; but when the vehicle is loaded and the weight of the load depresses the side springs $a$, or the body has a sudden end movement or chuck, these springs lengthen longitudinally, and being secured to the frame the longitudinal movement is exerted on the ends of the springs pivoted in the sleeves $b$, which, sliding on their sleeve-bearings $g$, allow the lengthening to take place without any torsional influence on the spring $j$, as will be understood by reference to Fig. 2; and if the weight exerted on the end spring $j$ lengthens it, its ends swing in the arms $h$, without any torsional influence on the springs $a$. These springs, therefore, although firmly connected to each other at their ends, have yet each a free longitudinal motion independent of each other, thus preventing any twisting or torsion of their ends, and the consequent breaking.

In the drawing, I have shown only one end spring at the front, but it is obvious that both the front and rear end springs may be connected alike.

To render the coupling noiseless a leather or rubber washer may be placed between the ends of the movable sleeve and the coupling-arms.

Having described my invention, I claim—

1. The couplings $b$, arranged to slide upon their bearings, in combination with the side springs $a$ and the coupling-arms $h$, of the end springs, constructed and arranged to operate as and for the purpose described.

2. The caps $l$ of the movable coupling-sleeve $b$, to increase the bearing-surface thereof upon the inner bearing-sleeve $g$, without interrupting the endwise movement of the sleeve $b$, as described.

3. The combination of the movable sleeve $b$, and its bearing-caps, with the inner bearing-sleeve $g$, of the coupling-arms, as described.

HACALIAH P. DOLSON.

Witnesses:
   FRED. D. VAN NOSTRAND,
   HIRAM WEED.